US012154191B2

(12) United States Patent
Backer

(10) Patent No.: US 12,154,191 B2
(45) Date of Patent: Nov. 26, 2024

(54) NON-LINEAR FILTERING FOR COLOR SPACE CONVERSIONS

(71) Applicant: QUALCOMM Incorporated, San Diego, CA (US)

(72) Inventor: Dam Backer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/454,797

(22) Filed: Nov. 12, 2021

(65) Prior Publication Data

US 2023/0154063 A1 May 18, 2023

(51) Int. Cl.
*G06T 11/00* (2006.01)
*G06T 1/20* (2006.01)
*G06T 9/00* (2006.01)

(52) U.S. Cl.
CPC .............. *G06T 11/001* (2013.01); *G06T 1/20* (2013.01); *G06T 9/00* (2013.01)

(58) Field of Classification Search
CPC ............ G06T 11/001; G06T 1/20; G06T 9/00
See application file for complete search history.

(56) References Cited

U.S. PATENT DOCUMENTS

| 5,822,452 | A * | 10/1998 | Tarolli ................... G06T 9/002 345/582 |
| 11,425,281 | B1 * | 8/2022 | Obryk ...................... H04N 1/60 |
| 2008/0205765 | A1 | 8/2008 | Fan et al. |
| 2008/0309968 | A1 * | 12/2008 | Berestov .............. H04N 1/6033 358/1.15 |
| 2012/0287139 | A1 * | 11/2012 | Wyatt .................... G09G 3/003 345/549 |
| 2013/0286034 | A1 * | 10/2013 | Diard ...................... G09G 5/02 345/589 |
| 2015/0279090 | A1 | 10/2015 | Keramidas et al. |
| 2017/0140556 | A1 * | 5/2017 | Safaee-Rad .......... G09G 3/3208 |
| 2017/0229052 | A1 | 8/2017 | Veernapu et al. |
| 2019/0096095 | A1 * | 3/2019 | Veernapu ................. G06T 9/00 |
| 2019/0295221 | A1 * | 9/2019 | Demos ................. H04N 19/176 |
| 2022/0368897 | A1 * | 11/2022 | Du ....................... H04N 19/167 |
| 2022/0392030 | A1 * | 12/2022 | Bogdanowicz ........ G09G 5/363 |

OTHER PUBLICATIONS

International Search Report and Written Opinion—PCT/US2022/046468—ISA/EPO—Feb. 3, 2023.

* cited by examiner

*Primary Examiner* — Sing-Wai Wu
*Assistant Examiner* — Khoa Vu
(74) *Attorney, Agent, or Firm* — QUALCOMM Incorporated

(57) ABSTRACT

Aspects presented herein relate to methods and devices for graphics processing including an apparatus, e.g., a GPU. The apparatus may receive a plurality of pixels associated with a first color space including a plurality of first color channels, at least one first color channel of the plurality of first color channels being a first compressed channel. The apparatus may also decompress the at least one first color channel of the plurality of first color channels, the at least one first color channel being decompressed from the first compressed channel to a first decompressed channel. Further, the apparatus may perform a color space conversion of the first color space associated with the plurality of pixels, such that the plurality of first color channels is converted to a plurality of second color channels, the plurality of second color channels being associated with a second color space for the plurality of pixels.

21 Claims, 13 Drawing Sheets

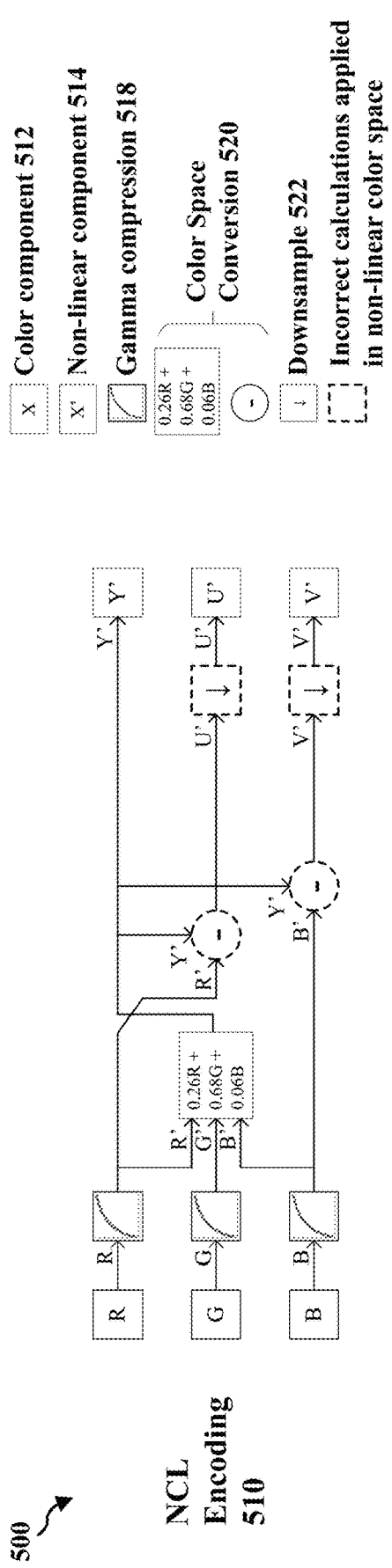
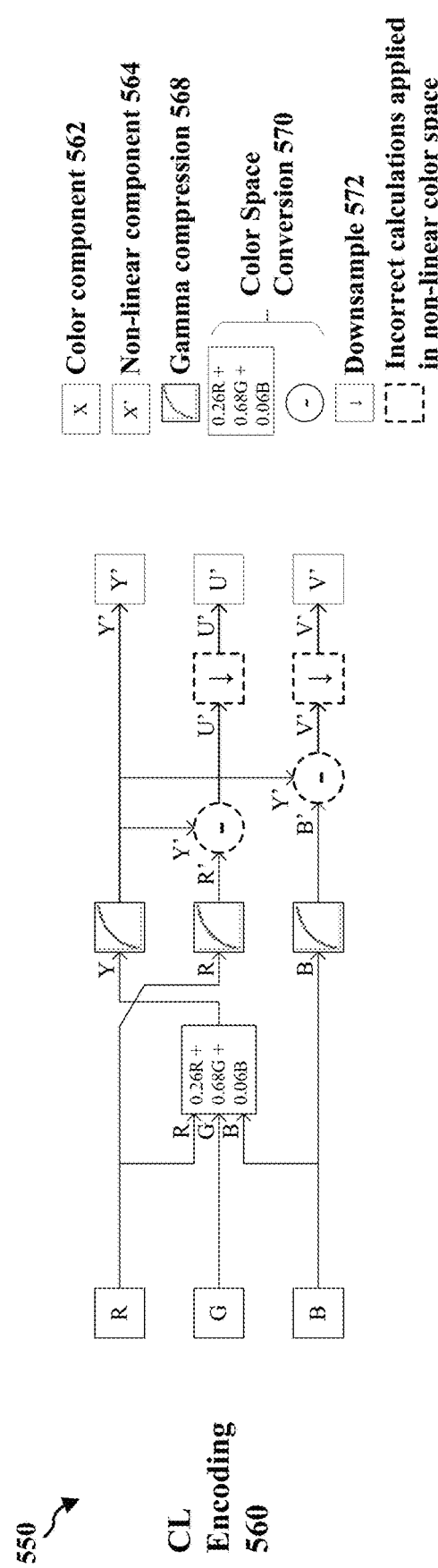
FIG. 5A
FIG. 5B

NON-LINEAR FILTERING FOR COLOR SPACE CONVERSIONS

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that may perform graphics processing. The apparatus may transmit a request for a plurality of pixels associated with a first color space, where a plurality of pixels is received based on the transmitted request. The apparatus may also receive a plurality of pixels associated with a first color space including a plurality of first color channels, at least one first color channel of the plurality of first color channels being a first compressed channel. Additionally, the apparatus may read the plurality of pixels associated with the first color space including the plurality of first color channels, where the plurality of pixels is read prior to decompressing the at least one first color channel. The apparatus may also decompress the at least one first color channel of the plurality of first color channels, the at least one first color channel being decompressed from the first compressed channel to a first decompressed channel. The apparatus may also filter each of the plurality of first color channels after the at least one first color channel is decompressed. Moreover, the apparatus may perform a color space conversion of the first color space associated with the plurality of pixels, such that the plurality of first color channels is converted to a plurality of second color channels, the plurality of second color channels being associated with a second color space for the plurality of pixels. The apparatus may also transmit the plurality of pixels associated with the second color space after the color space conversion.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5A is a diagram illustrating an example non-linear YUV encoding process.

FIG. 5B is a diagram illustrating an example non-linear YUV encoding process.

DETAILED DESCRIPTION

Figure 1:
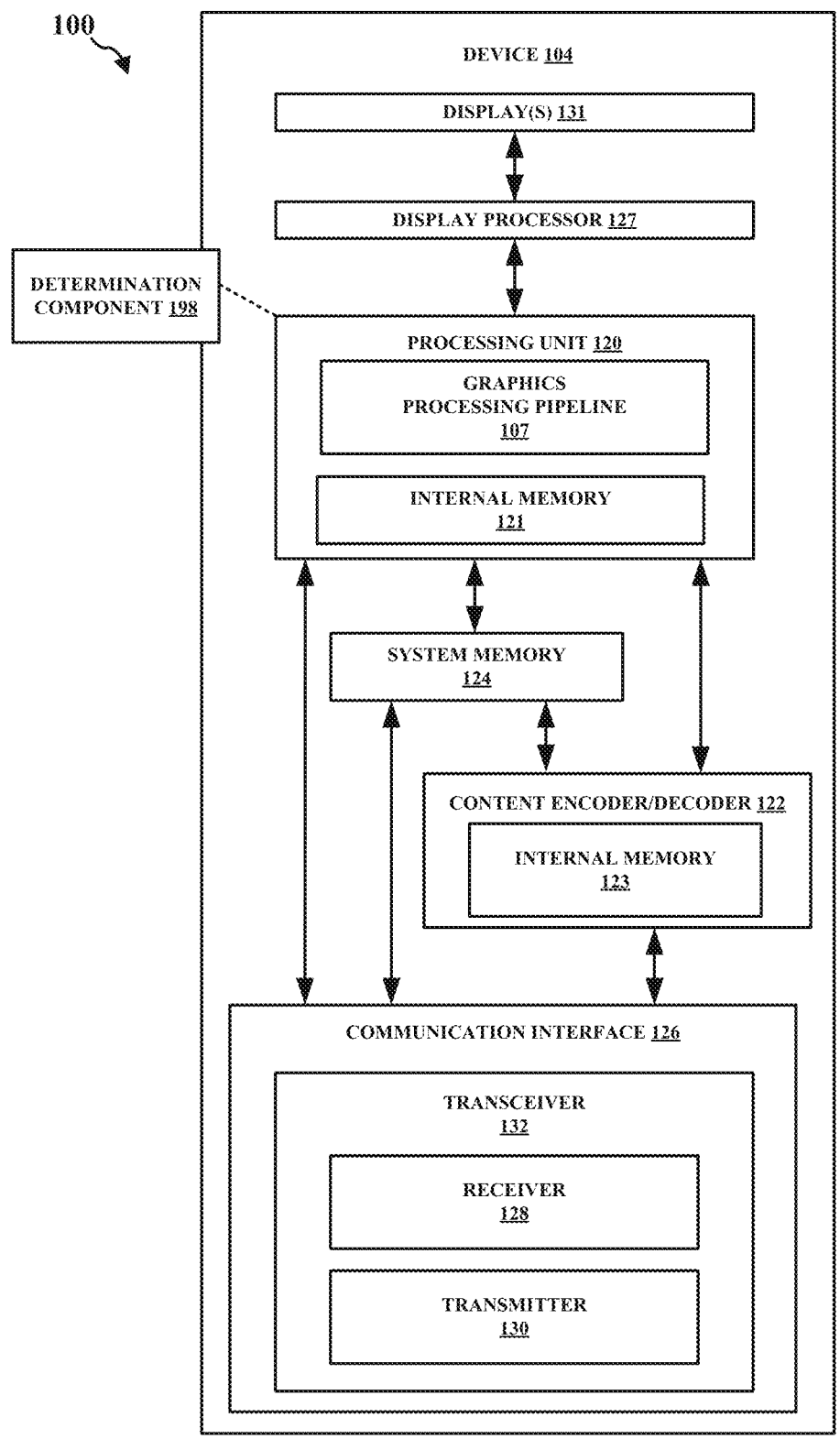
FIG. 1 is a block diagram that illustrates an example content generation system.

Some aspects of graphics processing or image processing may utilize a color space (i.e., a specific organization of colors). There a number of different types of color spaces or color models (i.e., an abstract mathematical model describing the way colors may be represented as tuples of numbers). For example, there are red (R) green (G) blue (B) (RGB) color spaces/models or luminance (Y) chrominance (UV) (YUV) color spaces/models. Additionally, color spaces may be converted from one color space to another color space in a process referred to as color space conversion (i.e., the translation of the representation of a color from one basis to another). A color space conversion may occur in the context of converting an image that is represented in one color space to a representation in another color space. Some aspects of color space conversion may have difficulty filtering in a non-linear space. For example, after an RGB image is generated, in order to preserve bit-rate, the RGB image may be non-linearly (gamma) compressed. The non-linear RGB may be converted to YUV for video encoding and transfer. On the receiving end, the image may be used as part of an image processing pipeline. This process may need filtering, but the YUV image may internally contain non-linear data. The correct sequence may need the YUV image to be converted to non-linear RGB, and then converted to linear RGB before filtering. For arbitrary pixel access, this sequence may be computationally intense and may not be directly supported by hardware. In addition to difficulty filtering in a non-linear space, some aspects of color space conversion may have difficulty converting to a linear space. Also, the conversion of non-linear YUV samples to linear space may be complex and difficult to implement efficiently in hardware or software. Aspects of the present disclosure may include non-linear YUV conversion processes that filter in a non-linear space. Also, aspects of the present disclosure may convert to a linear space during a non-linear YUV conversion process. For instance, aspects of the present disclosure may convert non-linear YUV samples to a linear space during a non-linear YUV conversion process. Additionally, in some instances, aspects of the present disclosure may include non-linear YUV conversion processes that utilize up-sampling and color space conversion operations with non-linear values.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to transmit a request for a plurality of pixels associated with a first color space, where a plurality of pixels is received based on the transmitted request. The determination component 198 may also be configured to receive a plurality of pixels associated with a first color space including a plurality of first color channels, at least one first color channel of the plurality of first color channels being a first compressed channel. The determination component 198 may also be configured to read the plurality of pixels associated with the first color space including the plurality of first color channels, where the plurality of pixels is read prior to decompressing the at least one first color channel. The determination component 198 may also be configured to decompress the at least one first color channel of the plurality of first color channels, the at least one first color channel being decompressed from the first compressed channel to a first decompressed channel. The determination component 198 may also be configured to filter each of the plurality of first color channels after the at least one first color channel is decompressed. The determination component 198 may also be configured to perform a color space conversion of the first color space associated with the plurality of pixels, such that the plurality of first color channels is converted to a plurality of second color channels, the plurality of second color channels being associated with a second color space for the plurality of pixels. The determination component 198 may also be configured to transmit the plurality of pixels associated with the second color space after the color space conversion. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
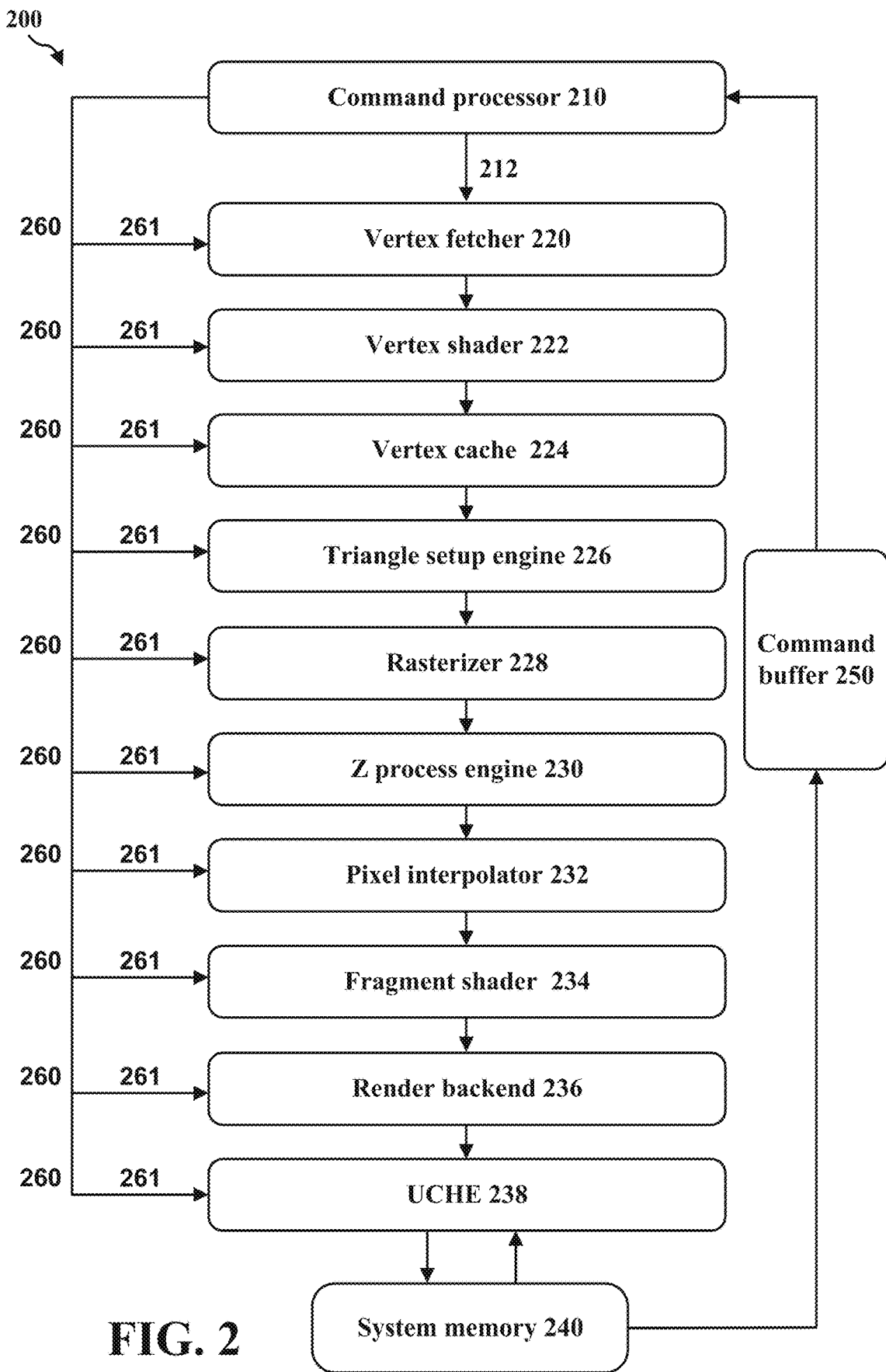
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In aspects of graphics processing or display/image processing, a number of different objects or colors may be adjusted or enhanced in an image or frame. By doing so, the objects or colors in an image may be improved, which may improve the overall appearance of the image. In order to adjust or enhance the objects or colors in an image, the objects or colors may need to be identified prior to the adjustment or enhancement. In some instances, this process may be performed in an image processing pipeline or a display processing pipeline. Moreover, this process may be referred to as an object or color identification process.

Figure 3:
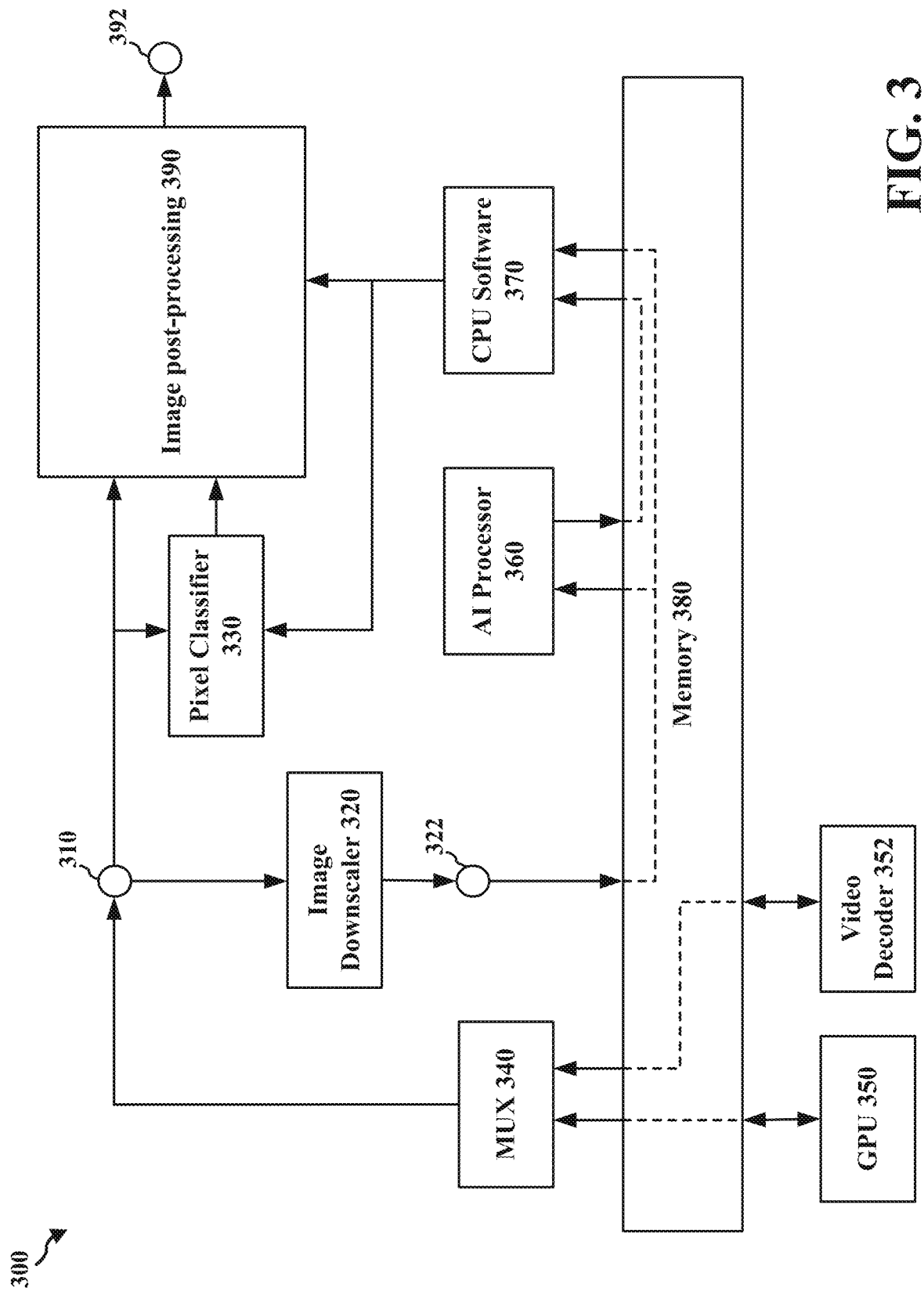
FIG. 3 is a diagram of components for graphics processing and display/image processing.

FIG. 3 illustrates a diagram 300 of components for graphics or display/image processing. For instance, FIG. 3 illustrates an example structure for an object or color classification process. As shown in FIG. 3, diagram 300 may include input 310, image downscaler 320, frame selection step 322, pixel classifier 330, and multiplexer (MUX) 340. Diagram 300 can also include a content source, which can include a GPU 350 and/or a video decoder 352. Additionally, diagram 300 may include artificial intelligence (AI) processor 360, CPU software 370, memory 380, image post-processing unit 390, and output 392. The input 310 of diagram 300 may include an image or image sequence. Also, the output 392 of diagram 300 may include the image or image sequence after processing.

As shown in FIG. 3, input 310 may communicate with image downscaler 320, pixel classifier 330, and image post-processing unit 390. Also, image downscaler 320 may communicate with frame selection step 322, e.g., to select a frame or image. Further, frame selection step 322 may communicate, e.g., a reduced resolution image, with AI processor 360 and/or CPU software 370, e.g., via memory 380. AI processor 360 may also communicate with CPU software 370 via memory 380. GPU 350 and video decoder 352 may communicate with MUX 340, e.g., via memory 380. MUX 340 may also communicate with input 310. Also, CPU software 370 may communicate with pixel classifier 330, e.g., a configuration update, and/or image post-processing unit 390. Pixel classifier 330 may also communicate with image post-processing unit 390. After this, image post-processing unit 390 may communicate with the output 392, e.g., an image or image sequence.

As further depicted in FIG. 3, the image post-processing unit 390 may be pre-frame composition or post-frame composition. In some aspects, diagram 300 may include a low-power real-time pixel processing pipeline, which may include input 310, image downscaler 320, pixel classifier 330, and/or image post-processing unit 390. Also, diagram 300 may include non-real-time processing, which may be performed on selected images or frames. This non-real-time processing may include frame selection step 322, MUX 340, GPU 350, video decoder 352, AI processor 360, CPU software 370, and memory 380. In some aspects, AI processor 360 may be referred to as a neural network processor. Also, the CPU software 370 may be utilized for a statistical analysis.

Some aspects of graphics processing or image processing may utilize a color space (i.e., a specific organization of colors). A color space may support a reproducible representation of color, such as via an analog or a digital representation. Also, a color space may help to provide the color capabilities of a particular device or digital file. For instance, when trying to reproduce color on a device, color spaces may show details of shadows/highlights and/or color saturation. There a number of different types of color spaces or color models (i.e., an abstract mathematical model describing the way colors may be represented as tuples of numbers). For example, there are red (R) green (G) blue (B) (RGB) color spaces/models or luminance (Y) chrominance (UV) (YUV) color spaces/models.

Additionally, color spaces may be converted from one color space to another color space in a process referred to as color space conversion (i.e., the translation of the representation of a color from one basis to another). A color space conversion may occur in the context of converting an image that is represented in one color space to a representation in another color space. For instance, one objective of a color space conversion may be to make a converted image look as similar as possible to an original image. One example of a color space conversion is converting an RGB color space to a YUV color space, or vice versa.

In some aspects, the use of YUV color space may be convenient for video streams of natural images. For example, it may be straightforward to encode and decode a full image (e.g., a one-to-one pixel ratio) between an RGB color space and a YUV color space. However, in an image processing pipeline that utilizes filtering from the YUV image, the encoding/decoding process may be difficult if the source image is non-linear (i.e., gamma) compressed with certain types of color space (e.g., a standard RGB (sRGB) color space).

Moreover, filtering may be utilized if a certain image (e.g., a YUV image) is part of an image processing or rendering pipeline that may apply scaling, rotations, or other arbitrary image access. If the source is linear RGB then filtering may be performed directly from the resulting YUV. If the source is non-linear (i.e., gamma) compressed sRGB, it may not be possible to correctly filter from the resulting YUV as the Y/U/V components are accumulations of non-linear R/G/B components. Instead, each sample may be converted from YUV to sRGB, then from sRGB to linear RGB before being filtered. Applying these conversions for all samples for an advanced (i.e., bi-cubic) filtering kernel may be costly. This may be even more complex when dealing with subsampled chroma.

As indicated above, YUV is a color encoding system based on human perception. For instance, Y=luminance (i.e., linear) or Y'=luma (i.e., non-linear) is the brightness value, to which the human eye is most sensitive. Another color encoding system based on human perception is YCbCr, which is similar to YUV except that the chrominance component is CbCr instead of UV. Chrominance (e.g., consisting of U/Cb (blue projection) and V/Cr (red projection)) is the color values to which the human eye is less sensitive, hence these values can be down-sampled. In some instances, YUV may be associated with analog television systems, while YCbCr may be the digital video equivalent.

As further indicated above, RGB and YUV may be utilized in different processes. For example, RGB may be utilized as a common color encoding system for computer images, while YUV may be typically utilized for a video transfer. The transfer between RGB and YUV may be a relatively straight forward process, such as the conversion of one channel in RGB (e.g., R/G/B) to a corresponding channel in YUV (e.g., Y/U/V). For instance, various industry standards may result in a weighted sum of the three components of RGB or YUV (e.g., R/G/B or Y/U/V) plus an offset and/or a scale.

Gamma compression is a non-linear transfer function that allows a higher dynamic range color to be stored at limited bitrate based on human perception sensitivity. For example, gamma compression may utilize more bits for the darker regions and fewer bits for the bright regions. The gamma curve may be frequently represented as a straight exponent (e.g., an exponent of 2.2), but various standards may have slight adjustments and/or clamping specifications. Additionally, gamma correction may be frequently implemented using a look-up table (LUT). Although the gamma curve may have been historically associated with the light response of television sets, in modern computer graphics the gamma curve may be used for its bitrate compression capabilities.

Color space conversion may also utilize filtering, i.e., taking samples from a kernel around a pixel and applying a weighted interpolation. Filtering is used to preserve image quality when sampling in a non-direct manner (e.g., a non-one-to-one manner) from an image. Moreover, filtering is common if the image is used as part of an image processing pipeline that may apply scaling, rotations, or other arbitrary access. In some instances, filtering may need samples to be in a linear space.

Gamma space filtering may have been originally utilized with non-linear monitor intensity (e.g., in cathode ray tube (CRT) monitors). More recently, gamma space filtering may be utilized so humans can determine the difference between darker shades better than lighter shades. For instance, in order to compress an image into a limited dynamic range (e.g., a bit depth range), linear images may be converted to gamma. A typical use for video and data may send these results to a display (e.g., modern displays may convert back to linear space). There may also be various types of gamma spaces, such that some gamma spaces are more complex than a certain amount (e.g., $X^{0.45}$).

In some aspects, combining-based image calculations (e.g., interpolative filtering, sampling, blending, etc.) may not work in a non-linear gamma space. For example, filtering may make the end result (i.e., after de-gamma) darker than intended. For instance, a key artifact may be that gamma space filtering is not 'energy' preserving. Moreover, the amount the end results gets darker may depend on the sample position.

Figure 4:
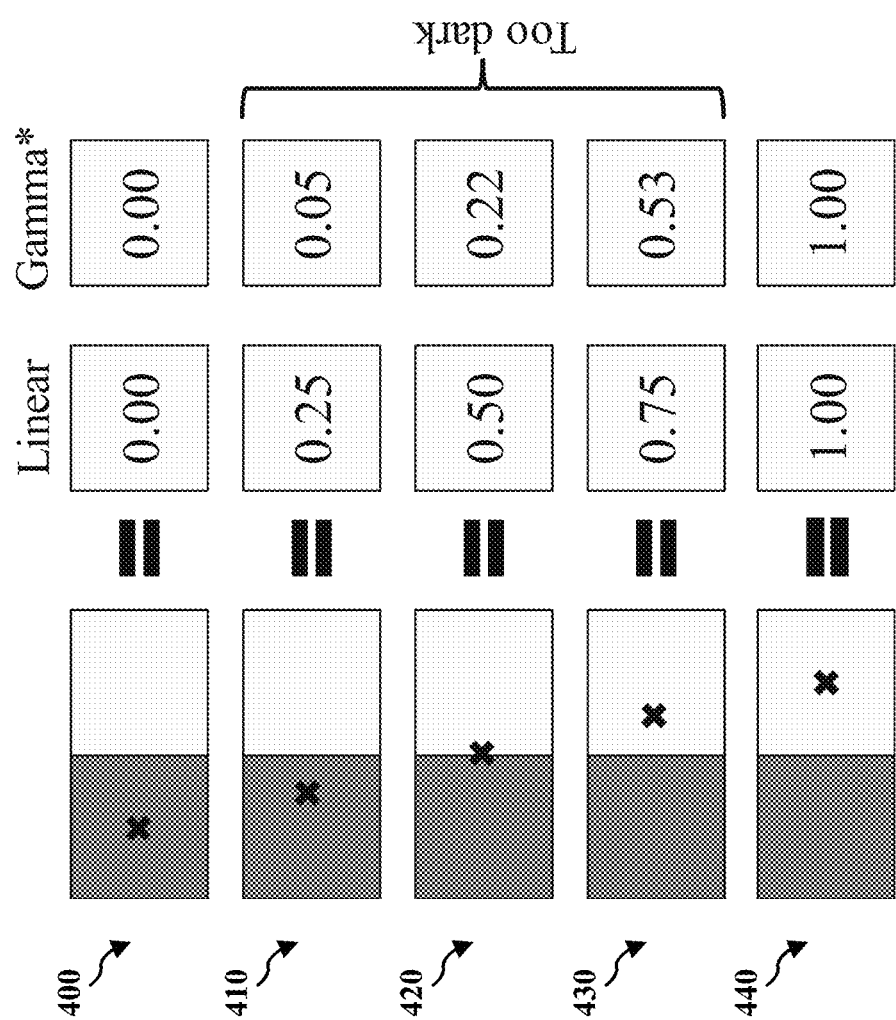
FIG. 4 includes diagrams illustrating an example linear sampling process and an example gamma space filtering process.

FIG. 4 includes diagrams 400, 410, 420, 430, and 440 illustrating an example linear sampling process and an example gamma space filtering process. More specifically, diagrams 400, 410, 420, 430, and 440 depict a sampling example of comparing a linear sampling process to a gamma space filtering process. As shown in FIG. 4, diagrams 400, 410, 420, 430, and 440 show a simplified linear sampling performed at the black 'x'. For instance, as the sampling process moves along (i.e., the black cross moves to the right), the amount of linear sampling is adjusted in a linear fashion. As further shown in FIG. 4, for gamma space filtering, the sampling is too dark in diagrams 410, 420, and 430.

Some aspects of color space conversion may have difficulty filtering in a non-linear space. For example, after an RGB image is generated, in order to preserve bit-rate, the RGB image may be non-linearly (gamma) compressed. The non-linear RGB may be converted to YUV for video encoding and transfer. On the receiving end, the image may be used as part of an image processing pipeline. This process may need filtering, but the YUV image may internally contain non-linear data. The correct sequence may need the YUV image to be converted to non-linear RGB, and then converted to linear RGB before filtering. For arbitrary pixel access, this sequence may be computationally intense and may not be directly supported by hardware.

In addition to difficulty filtering in a non-linear space, some aspects of color space conversion may have difficulty converting to a linear space. In some instances, a non-linear YUV source may originate from a high dynamic range RGB. Also, the non-linear YUV source may be compressed to a lower bit rate non-linear (gamma) sRGB to conserve bandwidth. Further, the non-linear YUV source may be converted to YUV (e.g., YUV4:2:0 or NV12) for further chroma sub-sampling compression. In a traditional access, a conversion from non-linear YUV to sRGB and/or high dynamic range linear RGB may be performed by inverting the source generation process on a per-pixel basis. The traditional access may be typically performed for the source image as a whole (e.g., no scaling or image manipulation). Also, the traditional access may not utilize the non-linear combination of pixels. An arbitrary non-linear YUV access may be an arbitrary pixel access (e.g., scaling, rotation, or other image processing) that may utilize filtering multiple samples together. In arbitrary pixel access, the filtering may need to occur in a linear space. Also, the conversion of non-linear YUV samples to linear space may be complex and difficult to implement efficiently in hardware or software.

FIGS. 5A and 5B include diagrams 500 and 550, respectively, illustrating example non-linear YUV encoding processes. More specifically, diagram 500 depicts non-linear YUV encoding process for non-constant luminance (NCL), and diagram 550 depicts non-linear YUV encoding process for constant luminance (CL). As shown in FIG. 5A, diagram 500 includes NCL encoding process 510 including color components 512 (e.g., R, G, B), non-linear components 514 (e.g., Y', U', V'), gamma compression 518, color space conversion 520, and downsample process 522. FIG. 5A also shows that certain aspects of the NCL encoding process 510 may result in incorrect calculations as they are applied in non-linear color space. As shown in FIG. 5B, diagram 550 includes CL encoding process 560 including color components 562 (e.g., R, G, B), non-linear components 564 (e.g., Y', U', V'), gamma compression 568, color space conversion 570, and downsample process 572. FIG. 5B also shows that certain aspects of the CL encoding process 560 may result in incorrect calculations as they are applied in non-linear color space.

As shown in FIGS. 5A and 5B, a non-linear YUV encoding process may include a gamma space compression, which may convert a high dynamic range RGB to a lower bitrate sRGB. The sRGB may include non-linear R', G', and B' components. The gamma space compression may also allow storage of an intermediate image. As further shown in FIGS. 5A and 5B, the non-linear YUV encoding process may include a color space conversion 520 and 570, such that the non-linear sRGB (e.g., R'G'B') may be converted to a non-linear YUV (e.g., Y'U'V'). There may additionally be chroma sub-sampling. As further shown in FIGS. 5A and 5B, a convenience of early gamma space compression in non-linear YUV encoding process may be the ability to store the intermediate lower bitrate sRGB image. One disadvantage of a non-linear YUV encoding process is that the color space conversion and sub-sampling operations may use non-linear values.

Figure 6A:
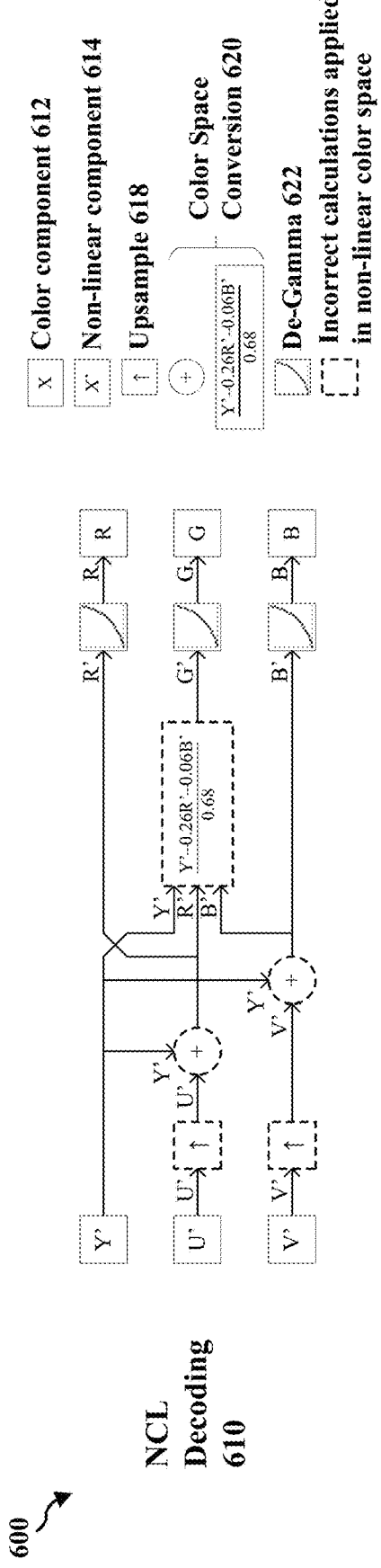
FIG. 6A is a diagram illustrating an example non-linear YUV decoding process.
Figure 6B:
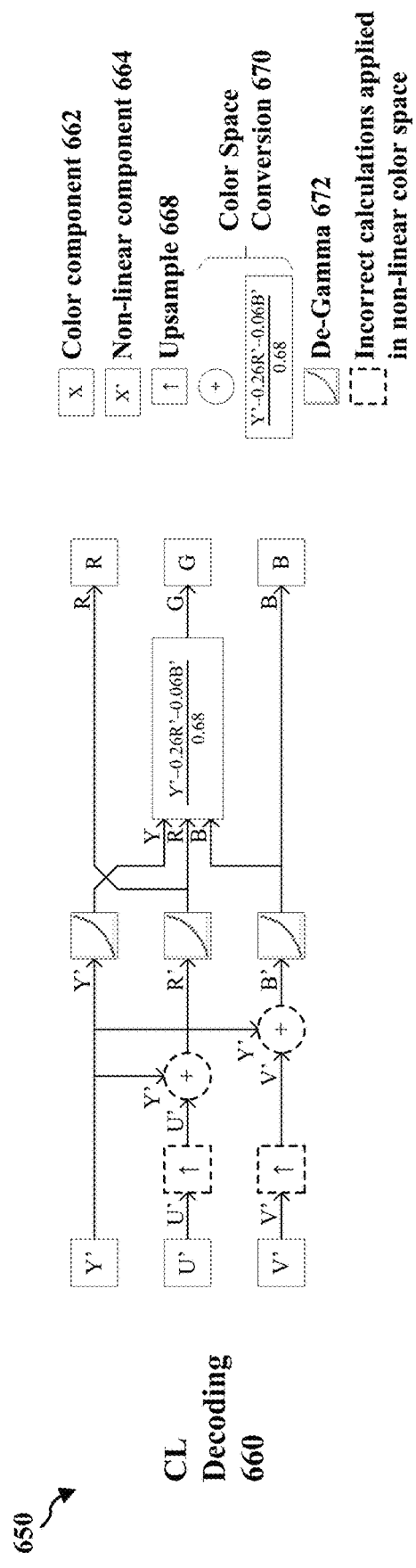
FIG. 6B is a diagram illustrating an example non-linear YUV decoding process.

FIGS. 6A and 6B include diagrams 600 and 650, respectively, illustrating example non-linear YUV decoding processes. More specifically, diagram 600 depicts non-linear YUV decoding process for non-constant luminance (NCL), and diagram 650 depicts non-linear YUV decoding process for constant luminance (CL). As shown in FIG. 6A, diagram 600 includes NCL decoding process 610 including color components 612 (e.g., R, G, B), non-linear components 614 (e.g., Y', U', V'), upsample process 618, color space conversion 620, and de-gamma process 622. FIG. 6A also shows that certain aspects of the NCL decoding process 610 may result in incorrect calculations as they are applied in non-linear color space. As shown in FIG. 6B, diagram 650 includes CL decoding process 660 including color components 662 (e.g., R, G, B), non-linear components 664 (e.g., Y', U', V'), upsample process 668, color space conversion 670, and de-gamma process 672. FIG. 6B also shows that certain aspects of the CL decoding process 660 may result in incorrect calculations as they are applied in non-linear color space.

As shown in FIGS. 6A and 6B, a non-linear YUV decoding process may include chroma up-sampling. The non-linear YUV decoding process may also include a color space conversion 620 and 670, such that the non-linear YUV (e.g., Y'U'V') may be converted to an sRGB (e.g., R'G'B'). Further, the non-linear YUV decoding process may include a de-gamma process 622 and 672, such that the sRGB (e.g., R'G'B') may be converted to a high dynamic range RGB. One disadvantage of a non-linear YUV decoding process is that up-sampling and color space conversion operations may use non-linear values.

Figure 7A:
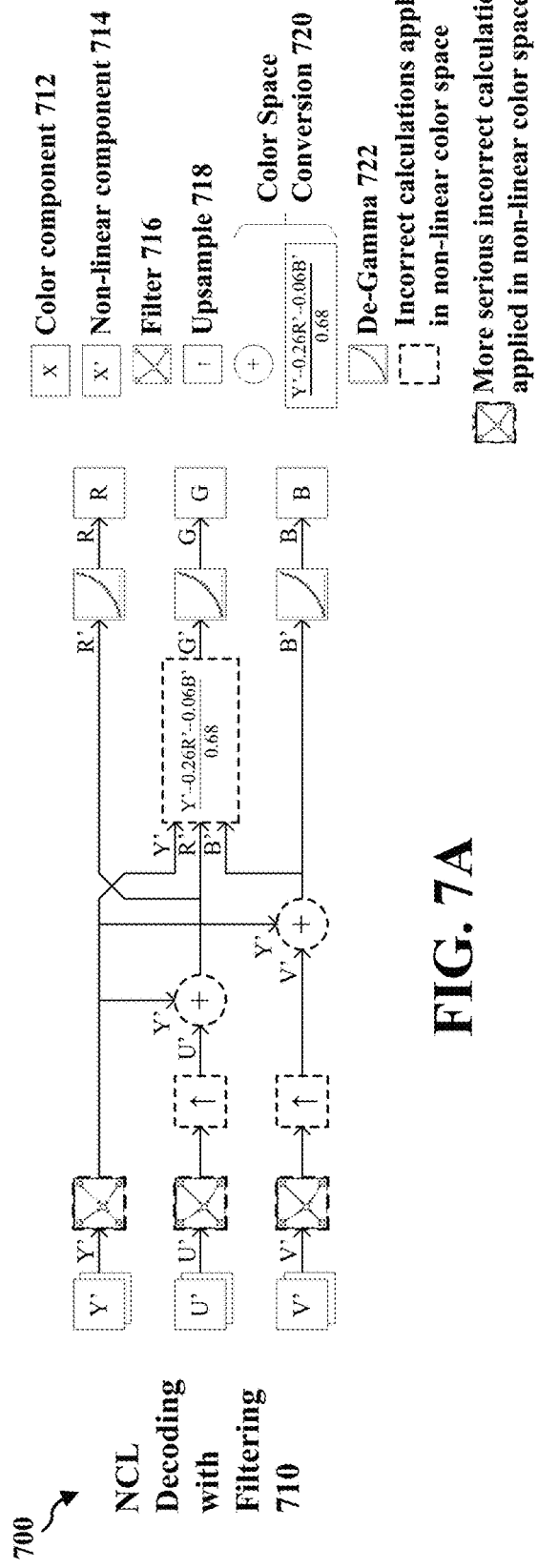
FIG. 7A is a diagram illustrating an example non-linear YUV decoding process with filtering.
Figure 7B:
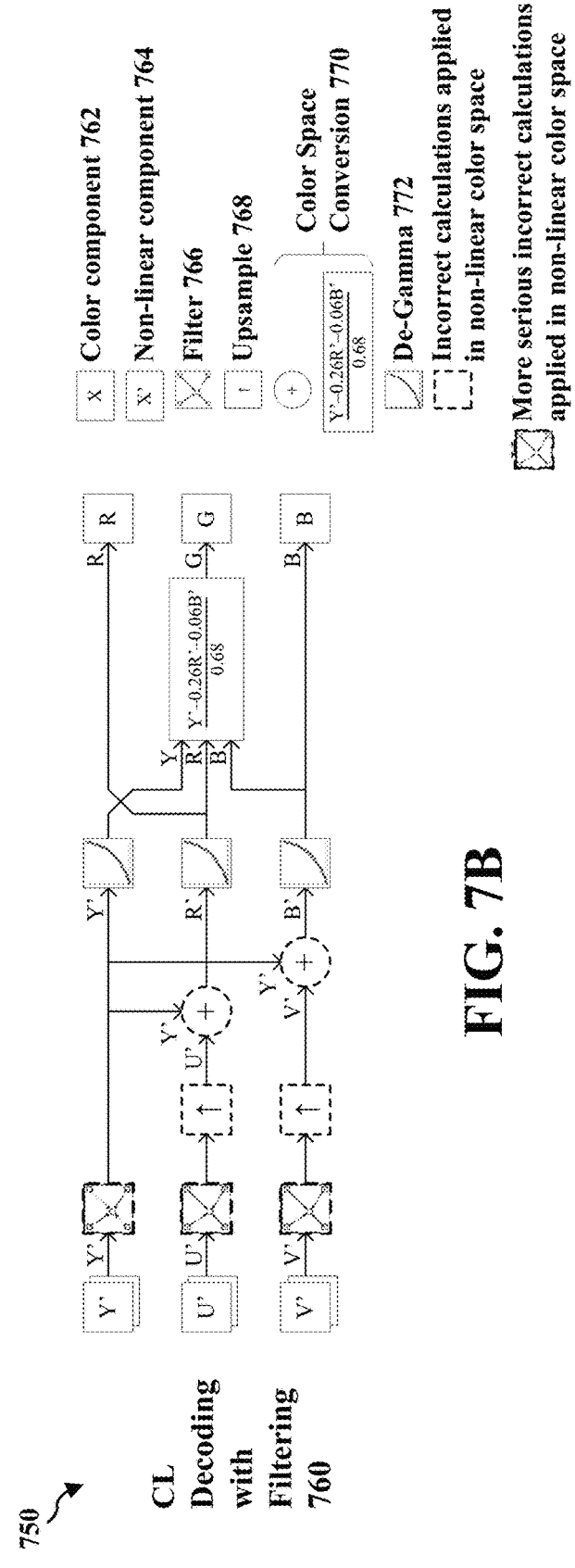
FIG. 7B is a diagram illustrating an example non-linear YUV decoding process with filtering.

FIGS. 7A and 7B include diagrams 700 and 750, respectively, illustrating example non-linear YUV decoding processes with filtering. More specifically, diagram 700 depicts non-linear YUV decoding process with filtering for non-constant luminance (NCL), and diagram 750 depicts non-linear YUV decoding process with filtering for constant luminance (CL). As shown in FIG. 7A, diagram 700 includes NCL decoding process with filtering 710 including color components 712 (e.g., R, G, B), non-linear components 714 (e.g., Y', U', V'), filter process 716, upsample process 718, color space conversion 720, and de-gamma process 722. FIG. 7A also shows that certain aspects of the NCL decoding process with filtering 710 may result in incorrect calculations as they are applied in non-linear color space. Also, filter process 716 may include more serious incorrect calculations that are applied in non-linear color space compared to incorrect calculations in other parts of the pipeline. As shown in FIG. 7B, diagram 750 includes CL decoding process with filtering 760 including color components 762 (e.g., R, G, B), non-linear components 764 (e.g., Y', U', V'), filter process 766, upsample process 768, color space conversion 770, and de-gamma process 772. FIG. 7B also shows that certain aspects of the CL decoding process with filtering 760 may result in incorrect calculations as they are applied in non-linear color space. Also, filter process 766 may include more serious incorrect calculations that are applied in non-linear color space compared to incorrect calculations in other parts of the pipeline.

As shown in FIGS. 7A and 7B, a non-linear YUV decoding process with filtering may include filter process 716 and 766 that can filter multiple samples together. However, this filter process may result in significant error due to non-linear values. The non-linear YUV decoding process with filtering 710 and 760 may also include chroma sub-sampling, which may result in some error due to non-linear values. The non-linear YUV decoding process with filtering 710 and 760 may also include color space conversion, which may result in some error when converting non-linear YUV (Y'U' V') to sRGB (e.g., R'G'B'). Further, the non-linear YUV decoding process with filtering 710 and 760 may include de-gamma process 722 and 772, which may convert sRGB to high dynamic range RGB. In some aspects, hardware pipelines may typically filter before applying more complex color processing operations. One disadvantage of a non-linear YUV decoding process with filtering is that up-sampling and color space conversion operations may utilize non-linear values.

Based on the above, it may be beneficial for non-linear YUV conversion processes to filter in a non-linear space. It may also be beneficial to convert to a linear space during a non-linear YUV conversion process. For instance, it may be beneficial to convert non-linear YUV samples to a linear space during a non-linear YUV conversion process. Further, it may be beneficial for non-linear YUV conversion processes to utilize up-sampling and color space conversion operations with non-linear values.

Aspects of the present disclosure may include non-linear YUV conversion processes that filter in a non-linear space. Also, aspects of the present disclosure may convert to a linear space during a non-linear YUV conversion process. For instance, aspects of the present disclosure may convert non-linear YUV samples to a linear space during a non-linear YUV conversion process. Additionally, in some instances, aspects of the present disclosure may include non-linear YUV conversion processes that utilize up-sampling and color space conversion operations with non-linear values. Aspects of the present disclosure may also move the non-linear compression from individual channels (e.g., R, G, B channels) to a certain channel (e.g., a luma (Y) channel) after a color space conversion (e.g., an RGB-to-YUV conversion). By doing so, aspects of the present disclosure may preserve the nature of non-linear luma compression while making it easier to sample, convert to linear components, and/or filter in a YUV space. Additionally, aspects of the present disclosure may allow certain video formats to remain unaffected, such as an intermediate YUV 4:2:0 video format (e.g., NV12).

Additionally, aspects of the present disclosure may include non-linear YUV conversion processes with solely a luma/luminance (Y/Y') component. As such, aspects of the present disclosure may provide non-linear YUV conversion processes for a luma/luminance (Y/Y') channel, i.e., without chroma/chrominance (UV/U'V') channels. For instance, aspects of the present disclosure may utilize a non-linear YUV encoding process for the luma/luminance component or channel. Aspects of the present disclosure may also utilize a non-linear YUV decoding process for the luma/luminance component or channel. Moreover, aspects of the present disclosure may also utilize a non-linear YUV decoding process with filtering for the luma/luminance component or channel.

Figure 8:
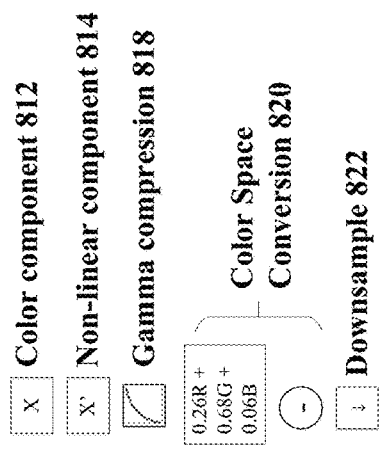
FIG. 8 is a diagram illustrating an example non-linear YUV encoding process.
Figure 8:
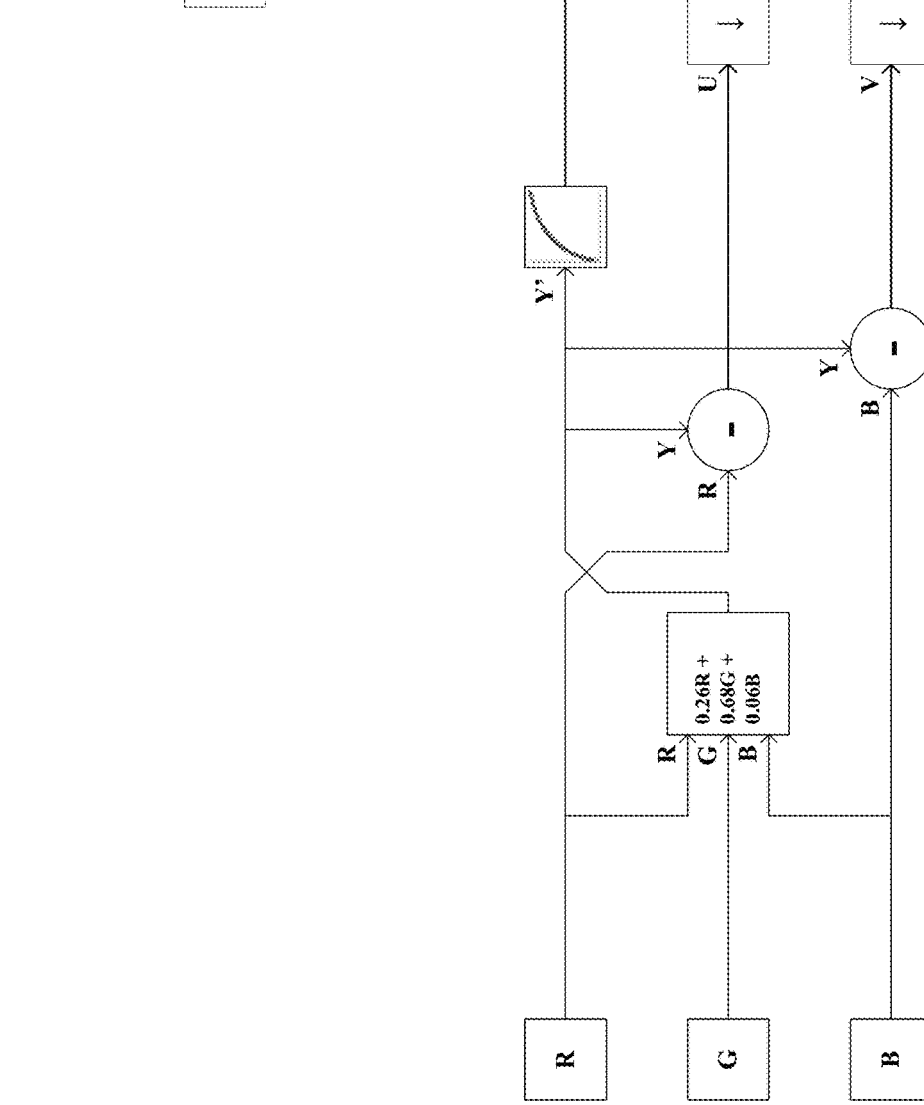

FIG. 8 includes diagram 800 illustrating an example non-linear YUV encoding process. More specifically, diagram 800 depicts non-linear YUV encoding process for a luma/luminance (Y/Y') component. As shown in FIG. 8, diagram 800 includes Y-only encoding process 810 including color components 812 (e.g., R, G, B), non-linear components 814 (e.g., Y', U', V'), gamma compression 818, color space conversion 820, and downsample process 822. FIG. 8 also shows that aspects of the Y-only encoding process 810 may not result in any step corresponding to an incorrect color space. Accordingly, the Y-only encoding process 810 may result in each step in the process performed correctly in linear color space.

As shown in FIG. 8, a non-linear YUV encoding process with solely a luma/luminance (Y/Y') component may include a color space conversion 820, such that the linear RGB may be converted to a linear YUV. FIG. 8 may also include a gamma space compression of solely the Y channel. As such, the gamma space compression in the non-linear YUV encoding process with solely a Y channel may not be performed on the UV channels. The non-linear YUV encoding process with solely a luma/luminance (Y/Y') component may additionally include chroma sub-sampling with the use of linear components. As further shown in FIG. 8, all of the color processing in Y-only encoding process 810 may be performed on linear components. Alternatively, for an sRGB (R'G'B') source, the Y-only encoding process may include R'G'B' inputs and a de-gamma process that is performed on each channel immediately after the R'G'B' inputs.

Figure 9:
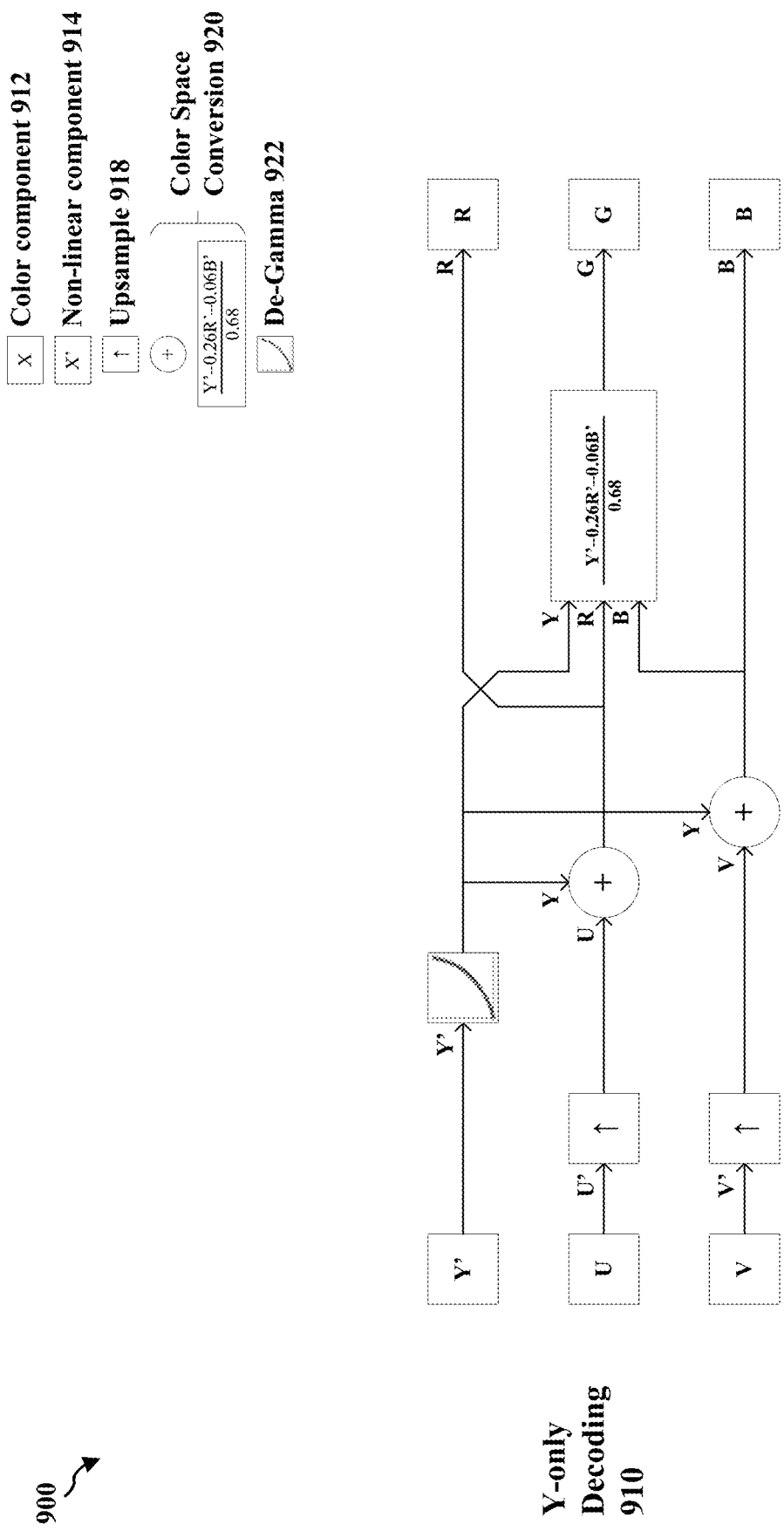
FIG. 9 is a diagram illustrating an example non-linear YUV decoding process.

FIG. 9 includes diagram 900 illustrating an example non-linear YUV decoding process. More specifically, diagram 900 depicts non-linear YUV decoding process for a luma/luminance (Y/Y') component. As shown in FIG. 9, diagram 900 includes Y-only decoding process 910 including color components 912 (e.g., R, G, B), non-linear components 914 (e.g., Y', U', V'), upsample process 918, color space conversion 920, and de-gamma process 922. FIG. 9 also shows that aspects of the Y-only decoding process 910 may not result in any step with calculations in an incorrect non-linear color space. Thus, the Y-only decoding process 910 may result in each step in the process performed correctly in linear color space.

As shown in FIG. 9, a non-linear YUV decoding process with solely a luma/luminance (Y/Y') component may include a color space conversion 920 from YUV to RGB, such that the linear YUV may be converted to RGB. FIG. 9 shows that Y-only decoding process 910 may include a chroma up-sampling process (e.g., upsample process 918). For instance, the non-linear YUV decoding process with solely a luma/luminance (Y/Y') component may additionally include chroma sub-sampling with the use of linear components. As further shown in FIG. 9, all of the color processing in Y-only decoding process 910 may be performed in a linear space. Further, as shown in FIG. 9, the de-gamma process of samples may be supported in hardware.

Figure 10:
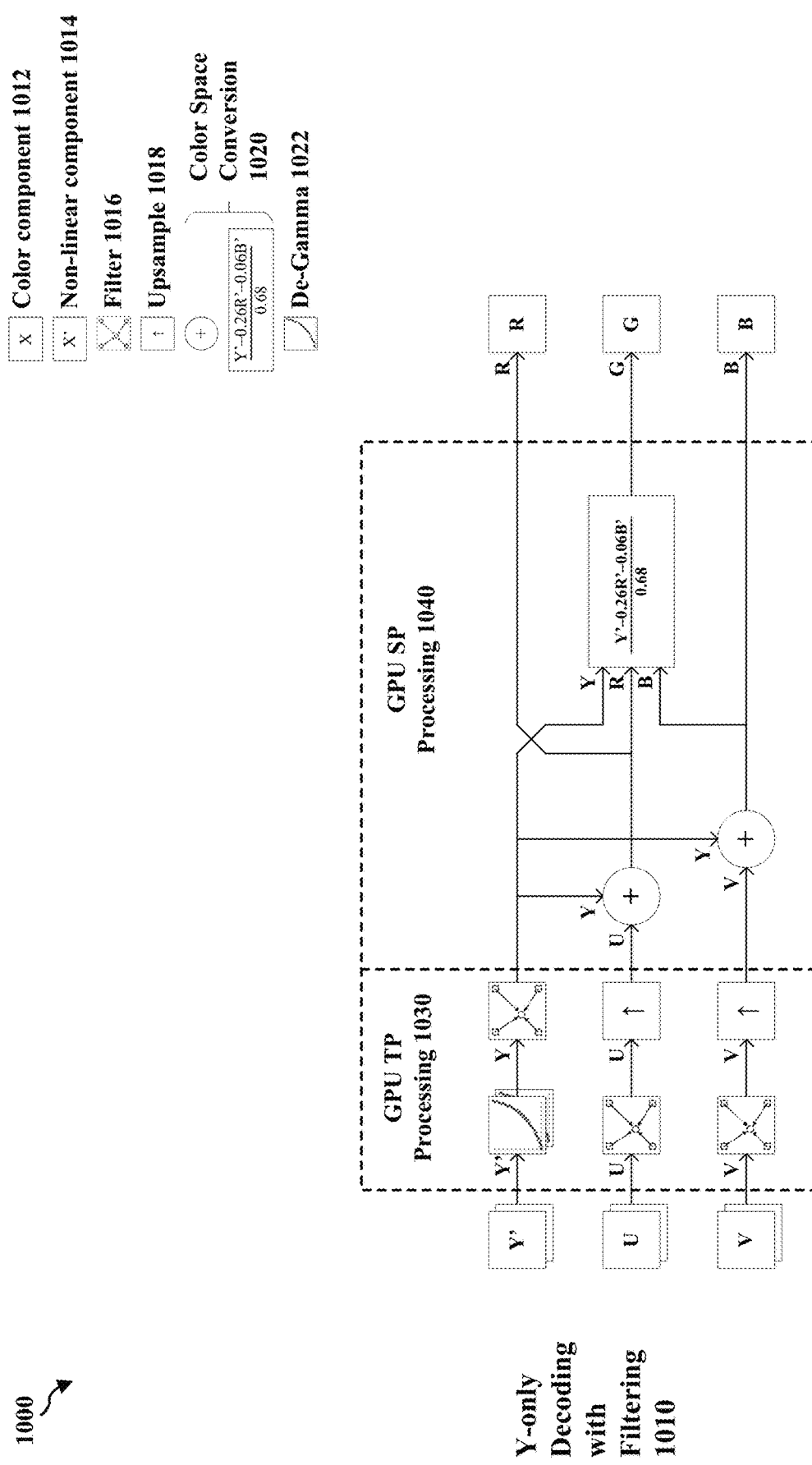
FIG. 10 is a diagram illustrating an example non-linear YUV decoding process with filtering.

FIG. 10 includes diagram 1000 illustrating an example non-linear YUV decoding process with filtering. More specifically, diagram 1000 depicts non-linear YUV decoding process with filtering for a luma/luminance (Y/Y') component. As shown in FIG. 10, diagram 1000 includes Y-only decoding process with filtering 1010 including color components 1012 (e.g., R, G, B), non-linear components 1014 (e.g., Y', U', V'), filter process 1016, upsample process 1018, color space conversion 1020, and de-gamma process 1022. Further, diagram 1000 in FIG. 10 includes a GPU texture processor (TP) processing portion 1030 and a GPU shader processor (SP) processing portion 1040. Accordingly, a portion of Y-only decoding process with filtering 1010 may be processed at the TP of the GPU (e.g., GPU TP processing portion 1030) and another portion of Y-only decoding process with filtering 1010 may be processed at the SP of the GPU (e.g., GPU SP processing portion 1040). FIG. 10 also shows that aspects of the Y-only decoding process with filtering 1010 may not result in any step with calculations in an incorrect non-linear color space. Accordingly, the Y-only decoding process with filtering 1010 may result in each step in the process performed correctly in linear color space.

As shown in FIG. 10, a non-linear YUV decoding process with filtering including solely a luma/luminance (Y/Y') component may include a color space conversion 1020 from YUV to RGB, such that the linear YUV may be converted to RGB. FIG. 10 shows that Y-only decoding process with filtering 1010 may include filtering multiple samples together (e.g., via filter process 1016). As such, the non-linear YUV decoding process with filtering including solely a Y channel may perform a Y-channel de-gamma process on all samples before filtering. The non-linear YUV decoding process with filtering including solely a luma/luminance (Y/Y') component may additionally include chroma sub-sampling with the use of linear components. As further shown in FIG. 10, all of the color processing in Y-only decoding process with filtering 1010 may be performed in a linear space. Further, as shown in FIG. 10, the de-gamma of samples may be supported in hardware before filtering.

In some aspects of filtering for a non-linear YUV conversion at a GPU, TP filtering may be forced on non-linear values. This may result in non-linear errors being propagated throughout the TP and SP processing. In contrast, aspects of the present disclosure may include a non-linear YUV conversion with TP filtering on solely linear values. Accordingly, aspects of the present disclosure may provide accurate values, such that no errors are propagated throughout the TP and SP processing. Aspects of the present disclosure may also allow for all of the TP and SP processing at a GPU to be performed on linear values. Further, aspects of the present disclosure may perform a de-gamma process of Y samples before filtering. In some instances, this may be supported by TP hardware.

Aspects of the present disclosure may include a number of benefits or advantages. For instance, aspects of the present disclosure may propagate accurate values throughout TP and SP processing. Aspects of the present disclosure may also move the non-linear compression from individual channels (e.g., R, G, B channels) to a certain channel (e.g., a luma (Y) channel) after a color space conversion (e.g., an RGB-to-YUV conversion). By doing so, aspects of the present disclosure may preserve the nature of non-linear luma compression while making it easier to sample, convert to linear components, and/or filter in a YUV space. Additionally, aspects of the present disclosure may allow certain video formats to remain unaffected, such as an intermediate YUV 4:2:0 video format (e.g., NV12).

Figure 11:
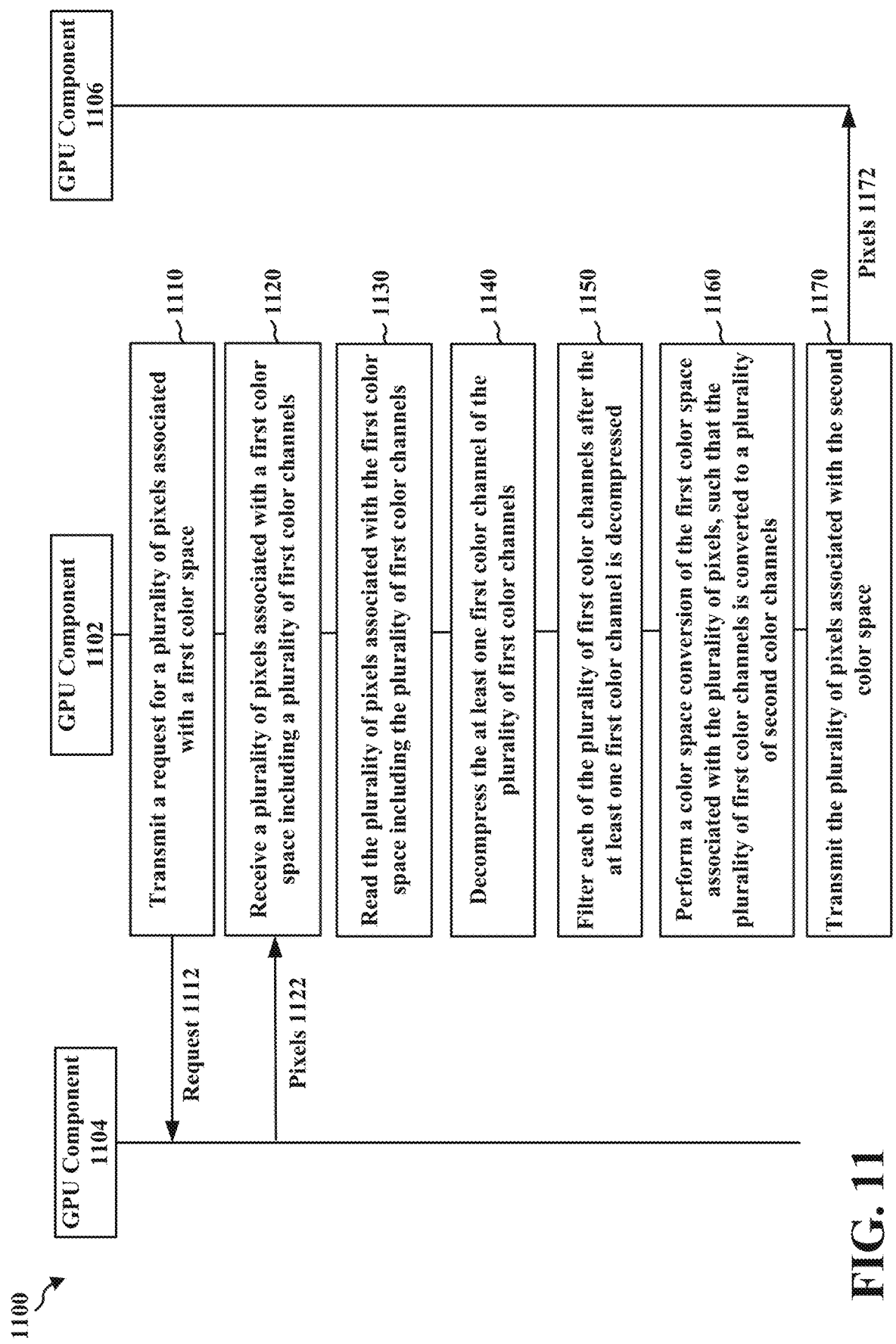
FIG. 11 is a communication flow diagram illustrating example communications between GPU components.

FIG. 11 is a communication flow diagram 1100 of graphics processing in accordance with one or more techniques of this disclosure. As shown in FIG. 11, diagram 1100 includes example communications between components of a GPU (or other graphics processor), e.g., GPU component 1102, GPU component 1104, and GPU component 1106, in accordance with one or more techniques of this disclosure.

At 1110, GPU component 1102 may transmit a request for a plurality of pixels associated with a first color space (e.g., request 1112), where a plurality of pixels is received based on the transmitted request. The request may be transmitted from a shader processor of a graphics processing unit (GPU) to a texture processor of the GPU.

At 1120, GPU component 1102 may receive a plurality of pixels associated with a first color space including a plurality of first color channels (e.g., pixels 1122), at least one first color channel of the plurality of first color channels being a first compressed channel. The first color space may be a luminance (Y) chrominance (UV) (YUV) color space and the second color space may be a red (R) green (G) blue (B) (RGB) color space.

At 1130, GPU component 1102 may read the plurality of pixels associated with the first color space including the plurality of first color channels, where the plurality of pixels is read prior to decompressing the at least one first color channel.

At 1140, GPU component 1102 may decompress the at least one first color channel of the plurality of first color channels, the at least one first color channel being decompressed from the first compressed channel to a first decompressed channel. The decompression of the at least one first channel may be a non-linear decompression, such that the decompression converts the at least one first channel from a non-linear channel to a linear channel. Also, one or more first channels of the plurality of first color channels may be linear channels, such that the one or more first channels are not decompressed. In some instances, the at least one first color channel may be non-linearly compressed prior to being decompressed.

At 1150, GPU component 1102 may filter each of the plurality of first color channels after the at least one first color channel is decompressed. Each of the plurality of first color channels may be linearly filtered, bi-linearly filtered, or non-linearly filtered.

At 1160, GPU component 1102 may perform a color space conversion of the first color space associated with the plurality of pixels, such that the plurality of first color channels is converted to a plurality of second color channels, the plurality of second color channels being associated with a second color space for the plurality of pixels. The color space conversion may be simultaneously performed for each of the plurality of first color channels. Also, the color space conversion may be performed in at least one of a texture processor of a graphics processing unit (GPU) or a shader processor of the GPU. In some aspects, GPU component 1102 may combine the at least one first channel with at least one other first channel of the plurality of first color channels and at least one additional first channel of the plurality of first color channels. For instance, performing the color space conversion of the first color space may further include combining the at least one first channel with at least one other first channel of the plurality of first color channels and at least one additional first channel of the plurality of first color channels. The combination of the at least one first channel with the at least one other first channel and the at least one additional first channel may be performed by a matrix combiner.

At 1170, GPU component 1102 may transmit the plurality of pixels associated with the second color space (e.g., pixels 1172) after the color space conversion. The plurality of pixels may be transmitted to a shader processor of a graphics processing unit (GPU).

Figure 12:
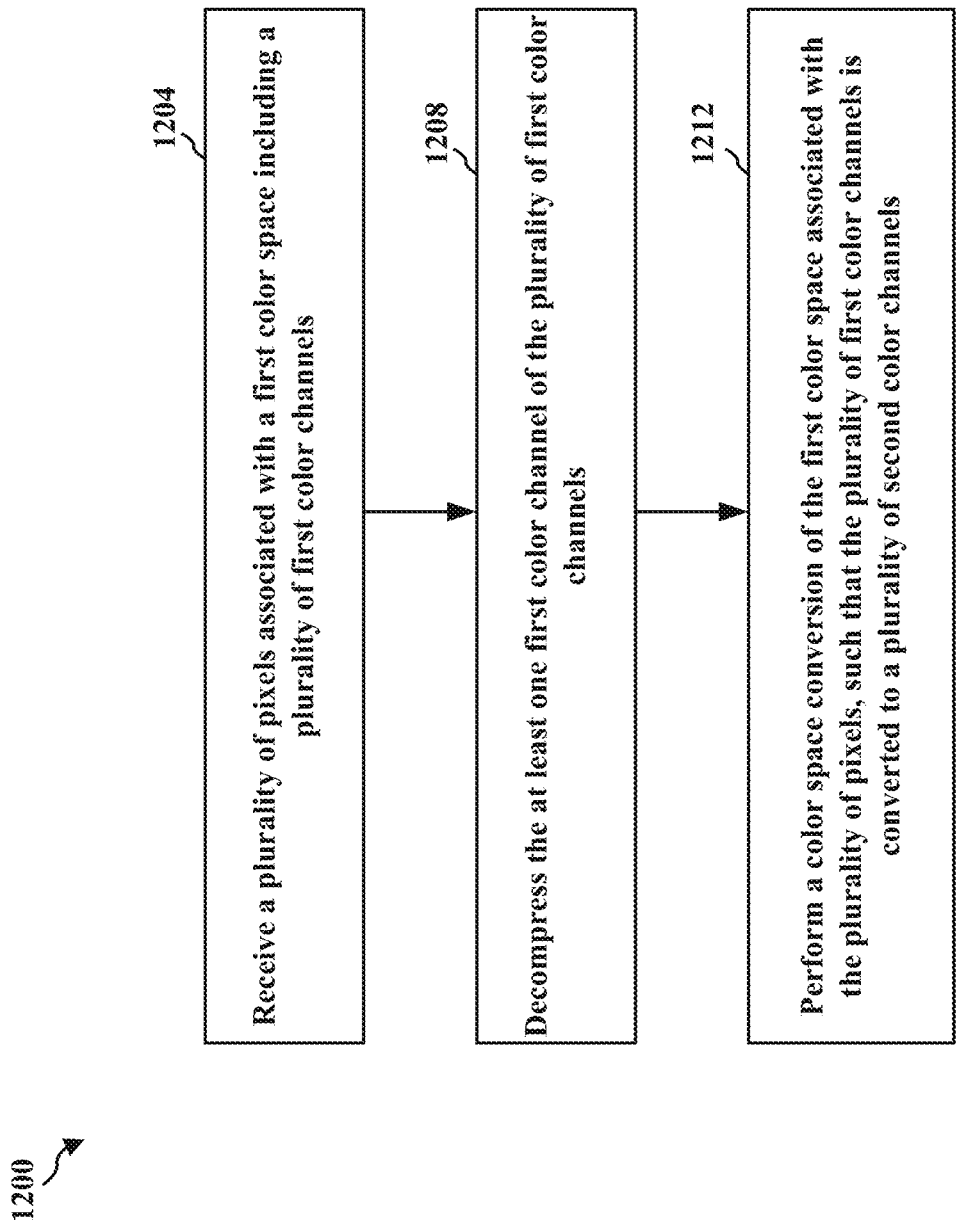
FIG. 12 is a flowchart of an example method of graphics processing.

FIG. 12 is a flowchart 1200 of an example method of graphics processing in accordance with one or more techniques of this disclosure. The method may be performed by a GPU, such as an apparatus for graphics processing, a graphics processor, a wireless communication device, and/or any apparatus that may perform graphics processing as used in connection with the examples of FIGS. 1-11. The methods described herein may provide a number of benefits, such as improving resource utilization and/or power savings.

At 1204, the GPU may receive a plurality of pixels associated with a first color space including a plurality of first color channels, at least one first color channel of the plurality of first color channels being a first compressed channel, as described in connection with the examples in FIGS. 1-11. For example, as described in 1120 of FIG. 11, GPU component 1102 may receive a plurality of pixels associated with a first color space including a plurality of first color channels, at least one first color channel of the plurality of first color channels being a first compressed channel. Further, step 1204 may be performed by processing unit 120 in FIG. 1. The first color space may be a luminance (Y) chrominance (UV) (YUV) color space and the second color space may be a red (R) green (G) blue (B) (RGB) color space.

At 1208, the GPU may decompress the at least one first color channel of the plurality of first color channels, the at least one first color channel being decompressed from the first compressed channel to a first decompressed channel, as described in connection with the examples in FIGS. 1-11. For example, as described in 1140 of FIG. 11, GPU component 1102 may decompress the at least one first color channel of the plurality of first color channels, the at least one first color channel being decompressed from the first compressed channel to a first decompressed channel. Further, step 1208 may be performed by processing unit 120 in FIG. 1. The decompression of the at least one first channel may be a non-linear decompression, such that the decompression converts the at least one first channel from a non-linear channel to a linear channel. Also, one or more first channels of the plurality of first color channels may be linear channels, such that the one or more first channels are not decompressed. In some instances, the at least one first color channel may be non-linearly compressed prior to being decompressed.

At 1212, the GPU may perform a color space conversion of the first color space associated with the plurality of pixels, such that the plurality of first color channels is converted to a plurality of second color channels, the plurality of second color channels being associated with a second color space for the plurality of pixels, as described in connection with the examples in FIGS. 1-11. For example, as described in 1160 of FIG. 11, GPU component 1102 may perform a color space conversion of the first color space associated with the plurality of pixels, such that the plurality of first color channels is converted to a plurality of second color channels, the plurality of second color channels being associated with a second color space for the plurality of pixels. Further, step 1212 may be performed by processing unit 120 in FIG. 1. The color space conversion may be simultaneously performed for each of the plurality of first color channels. Also, the color space conversion may be performed in at least one of a texture processor of a graphics processing unit (GPU) or a shader processor of the GPU. In some aspects, GPU component 1102 may combine the at least one first channel with at least one other first channel of the plurality of first color channels and at least one additional first channel of the plurality of first color channels. For instance, performing the color space conversion of the first color space may further include combining the at least one first channel with at least one other first channel of the plurality of first color channels and at least one additional first channel of the plurality of first color channels. The combination of the at least one first channel with the at least one other first channel and the at least one additional first channel may be performed by a matrix combiner.

Figure 13:
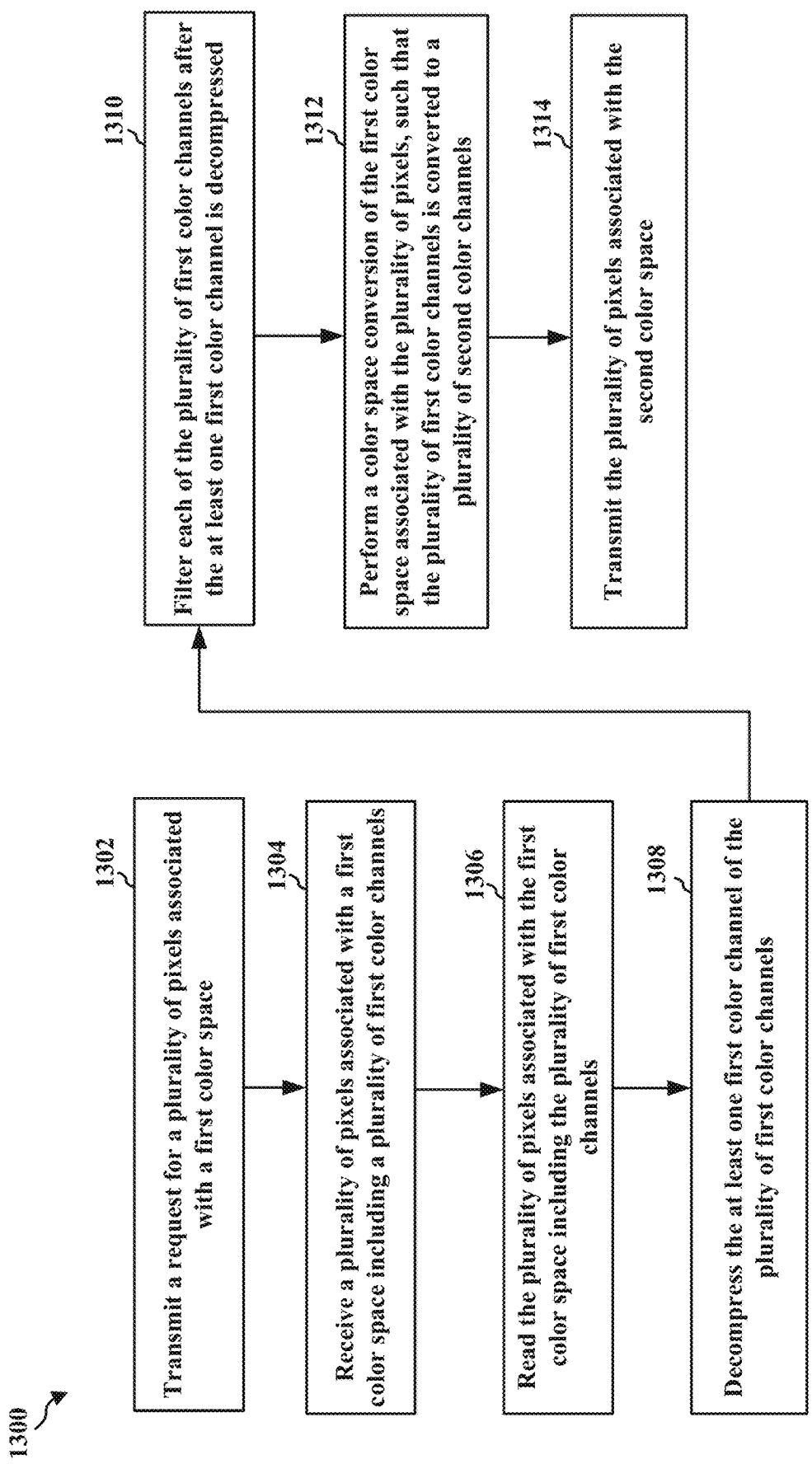
FIG. 13 is a flowchart of an example method of graphics processing.

FIG. 13 is a flowchart 1300 of an example method of graphics processing in accordance with one or more techniques of this disclosure. The method may be performed by a GPU, such as an apparatus for graphics processing, a graphics processor, a wireless communication device, and/or any apparatus that may perform graphics processing as used in connection with the examples of FIGS. 1-11. The methods described herein may provide a number of benefits, such as improving resource utilization and/or power savings.

At 1302, the GPU may transmit a request for a plurality of pixels associated with a first color space, where a plurality of pixels is received based on the transmitted request, as described in connection with the examples in FIGS. 1-11. For example, as described in 1110 of FIG. 11, GPU component 1102 may transmit a request for a plurality of pixels associated with a first color space, where a plurality of pixels is received based on the transmitted request. Further, step 1302 may be performed by processing unit 120 in FIG. 1. The request may be transmitted from a shader processor of a graphics processing unit (GPU) to a texture processor of the GPU.

At 1304, the GPU may receive a plurality of pixels associated with a first color space including a plurality of first color channels, at least one first color channel of the plurality of first color channels being a first compressed channel, as described in connection with the examples in FIGS. 1-11. For example, as described in 1120 of FIG. 11, GPU component 1102 may receive a plurality of pixels associated with a first color space including a plurality of first color channels, at least one first color channel of the plurality of first color channels being a first compressed channel. Further, step 1304 may be performed by processing unit 120 in FIG. 1. The first color space may be a luminance (Y) chrominance (UV) (YUV) color space and the second color space may be a red (R) green (G) blue (B) (RGB) color space.

At 1306, the GPU may read the plurality of pixels associated with the first color space including the plurality of first color channels, where the plurality of pixels is read prior to decompressing the at least one first color channel, as described in connection with the examples in FIGS. 1-11. For example, as described in 1130 of FIG. 11, GPU component 1102 may read the plurality of pixels associated with the first color space including the plurality of first color channels, where the plurality of pixels is read prior to decompressing the at least one first color channel. Further, step 1306 may be performed by processing unit 120 in FIG. 1.

At 1308, the GPU may decompress the at least one first color channel of the plurality of first color channels, the at least one first color channel being decompressed from the first compressed channel to a first decompressed channel, as described in connection with the examples in FIGS. 1-11. For example, as described in 1140 of FIG. 11, GPU component 1102 may decompress the at least one first color channel of the plurality of first color channels, the at least one first color channel being decompressed from the first compressed channel to a first decompressed channel. Further, step 1308 may be performed by processing unit 120 in FIG. 1. The decompression of the at least one first channel may be a non-linear decompression, such that the decompression converts the at least one first channel from a non-linear channel to a linear channel. Also, one or more first channels of the plurality of first color channels may be linear channels, such that the one or more first channels are not decompressed. In some instances, the at least one first color channel may be non-linearly compressed prior to being decompressed.

At 1310, the GPU may filter each of the plurality of first color channels after the at least one first color channel is decompressed, as described in connection with the examples in FIGS. 1-11. For example, as described in 1150 of FIG. 11, GPU component 1102 may filter each of the plurality of first color channels after the at least one first color channel is decompressed. Further, step 1310 may be performed by processing unit 120 in FIG. 1. Each of the plurality of first color channels may be linearly filtered, bi-linearly filtered, or non-linearly filtered.

At 1312, the GPU may perform a color space conversion of the first color space associated with the plurality of pixels, such that the plurality of first color channels is converted to a plurality of second color channels, the plurality of second color channels being associated with a second color space for the plurality of pixels, as described in connection with the examples in FIGS. 1-11. For example, as described in 1160 of FIG. 11, GPU component 1102 may perform a color space conversion of the first color space associated with the plurality of pixels, such that the plurality of first color channels is converted to a plurality of second color channels, the plurality of second color channels being associated with a second color space for the plurality of pixels. Further, step 1312 may be performed by processing unit 120 in FIG. 1. The color space conversion may be simultaneously performed for each of the plurality of first color channels. Also, the color space conversion may be performed in at least one of a texture processor of a graphics processing unit (GPU) or a shader processor of the GPU. In some aspects, GPU component 1102 may combine the at least one first channel with at least one other first channel of the plurality of first color channels and at least one additional first channel of the plurality of first color channels. For instance, performing the color space conversion of the first color space may further include combining the at least one first channel with at least one other first channel of the plurality of first color channels and at least one additional first channel of the plurality of first color channels. The combination of the at least one first channel with the at least one other first channel and the at least one additional first channel may be performed by a matrix combiner.

At 1314, the GPU may transmit the plurality of pixels associated with the second color space after the color space conversion, as described in connection with the examples in FIGS. 1-11. For example, as described in 1170 of FIG. 11, GPU component 1102 may transmit the plurality of pixels associated with the second color space after the color space conversion. Further, step 1314 may be performed by processing unit 120 in FIG. 1. The plurality of pixels may be transmitted to a shader processor of a graphics processing unit (GPU).

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for receiving a plurality of pixels associated with a first color space including a plurality of first color channels, at least one first color channel of the plurality of first color channels being a first compressed channel; means for decompressing the at least one first color channel of the plurality of first color channels, the at least one first color channel being decompressed from the first compressed channel to a first decompressed channel; means for performing a color space conversion of the first color space associated with the plurality of pixels, such that the plurality of first color channels is converted to a plurality of second color channels, the plurality of second color channels being associated with a second color space for the plurality of pixels; means for combining the at least one first channel with at least one other first channel of the plurality of first color channels and at least one additional first channel of the plurality of first color channels; means for filtering each of the plurality of first color channels after the at least one first color channel is decompressed; means for reading the plurality of pixels associated with the first color space including the plurality of first color channels, where the plurality of pixels is read prior to decompressing the at least one first color channel; means for transmitting a request for the plurality of pixels associated with the first color space, where the plurality of pixels is received based on the transmitted request; and means for transmitting the plurality of pixels associated with the second color space after the color space conversion.

The subject matter described herein may be implemented to realize one or more benefits or advantages. For instance, the described graphics processing techniques may be used by a GPU, a graphics processor, or some other processor that may perform graphics processing to implement the non-linear filtering techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize non-linear filtering techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: receive a plurality of pixels associated with a first color space including a plurality of first color channels, at least one first color channel of the plurality of first color channels being a first compressed channel; decompress the at least one first color channel of the plurality of first color channels, the at least one first color channel being decompressed from the first compressed channel to a first decompressed channel; and perform a color space conversion of the first color space associated with the plurality of pixels, such that the plurality of first color channels is converted to a plurality of second color channels, the plurality of second color channels being associated with a second color space for the plurality of pixels.

Aspect 2 is the apparatus of aspect 1, where the decompression of the at least one first channel is a non-linear decompression, such that the decompression converts the at least one first channel from a non-linear channel to a linear channel.

Aspect 3 is the apparatus of any of aspects 1 and 2, where one or more first channels of the plurality of first color channels are linear channels, such that the one or more first channels are not decompressed.

Aspect 4 is the apparatus of any of aspects 1 to 3, where to perform the color space conversion of the first color space, the at least one processor is configured to: combine the at least one first channel with at least one other first channel of the plurality of first color channels and at least one additional first channel of the plurality of first color channels.

Aspect 5 is the apparatus of any of aspects 1 to 4, where the combination of the at least one first channel with the at least one other first channel and the at least one additional first channel is performed by a matrix combiner.

Aspect 6 is the apparatus of any of aspects 1 to 5, where the at least one processor is further configured to: filter each of the plurality of first color channels after the at least one first color channel is decompressed.

Aspect 7 is the apparatus of any of aspects 1 to 6, where each of the plurality of first color channels is linearly filtered, bi-linearly filtered, or non-linearly filtered.

Aspect 8 is the apparatus of any of aspects 1 to 7, where the at least one first color channel is non-linearly compressed prior to being decompressed.

Aspect 9 is the apparatus of any of aspects 1 to 8, where the at least one processor is further configured to: read the plurality of pixels associated with the first color space including the plurality of first color channels, where the plurality of pixels is read prior to decompressing the at least one first color channel.

Aspect 10 is the apparatus of any of aspects 1 to 9, where the at least one processor is further configured to: transmit a request for the plurality of pixels associated with the first color space, where the plurality of pixels is received based on the transmitted request.

Aspect 11 is the apparatus of any of aspects 1 to 10, where the request is transmitted from a shader processor of a graphics processing unit (GPU) to a texture processor of the GPU.

Aspect 12 is the apparatus of any of aspects 1 to 11, where the at least one processor is further configured to: transmit the plurality of pixels associated with the second color space after the color space conversion.

Aspect 13 is the apparatus of any of aspects 1 to 12, where the plurality of pixels is transmitted to a shader processor of a graphics processing unit (GPU).

Aspect 14 is the apparatus of any of aspects 1 to 13, where the first color space is a luminance (Y) chrominance (UV) (YUV) color space and the second color space is a red (R) green (G) blue (B) (RGB) color space.

Aspect 15 is the apparatus of any of aspects 1 to 14, where the color space conversion is simultaneously performed for each of the plurality of first color channels.

Aspect 16 is the apparatus of any of aspects 1 to 15, where the color space conversion is performed in at least one of a texture processor of a graphics processing unit (GPU) or a shader processor of the GPU.

Aspect 17 is the apparatus of any of aspects 1 to 16, where the apparatus is a wireless communication device, further including at least one of an antenna or a transceiver coupled to the at least one processor.

Aspect 18 is a method of graphics processing for implementing any of aspects 1 to 17.

Aspect 19 is an apparatus for graphics processing including means for implementing any of aspects 1 to 17.

Aspect 20 is a computer-readable medium storing computer executable code, the code when executed by at least one processor causes the at least one processor to implement any of aspects 1 to 17.

What is claimed is:

1. An apparatus for graphics processing, comprising:
    memory; and
    at least one processor coupled to the memory and configured to:
        receive a plurality of pixels associated with a first color space including a plurality of first color channels, at least one first color channel of the plurality of first color channels being a first compressed channel;
        decompress the at least one first color channel of the plurality of first color channels, the at least one first color channel being decompressed from the first compressed channel to a first decompressed channel, wherein the decompression of the at least one first channel is a non-linear decompression such that the decompression converts the at least one first channel from a non-linear channel to a linear channel, and wherein one or more first channels of the plurality of first color channels are linear channels such that the one or more first channels are not decompressed, wherein the first compressed channel is a luminance (Y') channel and the first decompressed channel is a luma (Y) channel such that the decompression converts the at least one first channel from a non-linear luminance (Y') channel to a linear luma (Y) channel, and wherein the one or more first channels are linear chroma (UV) channels such that the one or more first channels are not decompressed;
        perform a color space conversion of the first color space associated with the plurality of pixels, such that the plurality of first color channels is converted to a plurality of second color channels, the plurality of second color channels being associated with a second color space for the plurality of pixels, wherein to perform the color space conversion of the first color space, the at least one processor is configured to: combine the at least one first channel with at least one other first channel of the plurality of first color channels and at least one additional first channel of the plurality of first color channels; and
        filter each of the plurality of first color channels after the decompression of the at least one first color channel,
        wherein each of the plurality of first color channels is non-linearly filtered,
        wherein the at least one processor is configured to perform the color space conversion with at least one of a texture processor of a graphics processing unit (GPU) or a shader processor of the GPU.

2. The apparatus of claim 1, wherein the combination of the at least one first channel with the at least one other first channel and the at least one additional first channel is configured to be performed by the at least one processor with a matrix combiner.

3. The apparatus of claim 1, wherein the at least one first color channel is non-linearly compressed prior to being decompressed.

4. The apparatus of claim 1, wherein the at least one processor is further configured to:
    read the plurality of pixels associated with the first color space including the plurality of first color channels, wherein the plurality of pixels is read prior to the decompression of the at least one first color channel.

5. The apparatus of claim 1, wherein the at least one processor is further configured to:
    transmit a request for the plurality of pixels associated with the first color space, wherein the at least one processor is configured to receive the plurality of pixels based on the transmitted request.

6. The apparatus of claim 5, wherein the at least one processor is configured to transmit the request from the shader processor of the GPU to the texture processor of the GPU.

7. The apparatus of claim 1, wherein the at least one processor is further configured to:
    transmit the plurality of pixels associated with the second color space after the color space conversion.

8. The apparatus of claim 7, wherein the at least one processor is configured to transmit the plurality of pixels to the shader processor of the GPU.

9. The apparatus of claim 1, wherein the first color space is a luminance (Y) chrominance (UV) (YUV) color space and the second color space is a red (R) green (G) blue (B) (RGB) color space.

10. The apparatus of claim 1, wherein the at least one processor is configured to perform the color space conversion simultaneously for each of the plurality of first color channels.

11. The apparatus of claim 1, where the apparatus is a wireless communication device, further comprising a transceiver coupled to the at least one processor, wherein to receive the plurality of pixels, the at least one processor is configured to receive, via the transceiver, the plurality of pixels.

12. A method of graphics processing, comprising:
receive a plurality of pixels associated with a first color space including a plurality of first color channels, at least one first color channel of the plurality of first color channels being a first compressed channel;
decompressing the at least one first color channel of the plurality of first color channels, the at least one first color channel being decompressed from the first compressed channel to a first decompressed channel, wherein the decompression of the at least one first channel is a non-linear decompression such that the decompression converts the at least one first channel from a non-linear channel to a linear channel, and wherein one or more first channels of the plurality of first color channels are linear channels such that the one or more first channels are not decompressed, wherein the first compressed channel is a luminance (Y') channel and the first decompressed channel is a luma (Y) channel such that the decompression converts the at least one first channel from a non-linear luminance (Y') channel to a linear luma (Y) channel, and wherein the one or more first channels are linear chroma (UV) channels such that the one or more first channels are not decompressed;
performing a color space conversion of the first color space associated with the plurality of pixels, such that the plurality of first color channels is converted to a plurality of second color channels, the plurality of second color channels being associated with a second color space for the plurality of pixels, wherein performing the color space conversion of the first color space further includes: combining the at least one first channel with at least one other first channel of the plurality of first color channels and at least one additional first channel of the plurality of first color channels; and
filtering each of the plurality of first color channels after the at least one first color channel is decompressed, wherein each of the plurality of first color channels is non-linearly filtered,
wherein the color space conversion is performed in at least one of a texture processor of a graphics processing unit (GPU) or a shader processor of the GPU.

13. The method of claim 12, wherein the combination of the at least one first channel with the at least one other first channel and the at least one additional first channel is performed by a matrix combiner.

14. The method of claim 12, wherein the at least one first color channel is non-linearly compressed prior to being decompressed.

15. The method of claim 12, further comprising:
reading the plurality of pixels associated with the first color space including the plurality of first color channels, wherein the plurality of pixels is read prior to decompressing the at least one first color channel.

16. The method of claim 12, further comprising:
transmitting a request for the plurality of pixels associated with the first color space, wherein the plurality of pixels is received based on the transmitted request,
wherein the request is transmitted from the shader processor of the GPU to the texture processor of the GPU.

17. The method of claim 12, further comprising:
transmitting the plurality of pixels associated with the second color space after the color space conversion, wherein the plurality of pixels is transmitted to the shader processor of the GPU.

18. The method of claim 12, wherein the first color space is a luminance (Y) chrominance (UV) (YUV) color space and the second color space is a red (R) green (G) blue (B) (RGB) color space.

19. The method of claim 12, wherein the color space conversion is simultaneously performed for each of the plurality of first color channels.

20. An apparatus for graphics processing, comprising:
means for receiving a plurality of pixels associated with a first color space including a plurality of first color channels, at least one first color channel of the plurality of first color channels being a first compressed channel;
means for decompressing the at least one first color channel of the plurality of first color channels, the at least one first color channel being decompressed from the first compressed channel to a first decompressed channel, wherein the decompression of the at least one first channel is a non-linear decompression such that the decompression converts the at least one first channel from a non-linear channel to a linear channel, and wherein one or more first channels of the plurality of first color channels are linear channels such that the one or more first channels are not decompressed, wherein the first compressed channel is a luminance (Y') channel and the first decompressed channel is a luma (Y) channel such that the decompression converts the at least one first channel from a non-linear luminance (Y') channel to a linear luma (Y) channel, and wherein the one or more first channels are linear chroma (UV) channels such that the one or more first channels are not decompressed;
means for performing a color space conversion of the first color space associated with the plurality of pixels, such that the plurality of first color channels is converted to a plurality of second color channels, the plurality of second color channels being associated with a second color space for the plurality of pixels, wherein the means for performing the color space conversion of the first color space is configured to: combine the at least one first channel with at least one other first channel of the plurality of first color channels and at least one additional first channel of the plurality of first color channels; and
means for non-linearly filtering each of the plurality of first color channels after the at least one first color channel is decompressed,
wherein the means for performing the color space conversion is performed in at least one of a texture processor of a graphics processing unit (GPU) or a shader processor of the GPU.

21. A non-transitory computer-readable medium storing computer executable code for graphics processing, the code when executed by a processor causes the processor to:
receive a plurality of pixels associated with a first color space including a plurality of first color channels, at least one first color channel of the plurality of first color channels being a first compressed channel;
decompress the at least one first color channel of the plurality of first color channels, the at least one first color channel being decompressed from the first compressed channel to a first decompressed channel, wherein the decompression of the at least one first channel is a non-linear decompression such that the decompression converts the at least one first channel from a non-linear channel to a linear channel, and wherein one or more first channels of the plurality of first color channels are linear channels such that the one or more first channels are not decompressed, wherein the first compressed channel is a luminance (Y') channel and the first decompressed channel is a luma (Y) channel such that the decompression converts the at least one first channel from a non-linear luminance (Y') channel to a linear luma (Y) channel, and wherein the one or more first channels are linear chroma (UV) channels such that the one or more first channels are not decompressed;

perform a color space conversion of the first color space associated with the plurality of pixels, such that the plurality of first color channels is converted to a plurality of second color channels, the plurality of second color channels being associated with a second color space for the plurality of pixels, wherein to perform the color space conversion of the first color space, the code when executed by the processor causes the processor to: combine the at least one first channel with at least one other first channel of the plurality of first color channels and at least one additional first channel of the plurality of first color channels; and filter each of the plurality of first color channels after the at least one first color channel is decompressed, wherein each of the plurality of first color channels is non-linearly filtered, wherein the color space conversion is performed in at least one of a texture processor of a graphics processing unit (GPU) or a shader processor of the GPU.

\* \* \* \* \*